W. A. BERGER.
LATERAL ADJUSTER FOR SURVEYING INSTRUMENTS.
APPLICATION FILED JUNE 10, 1907.
918,817.
Patented Apr. 20, 1909.
2 SHEETS—SHEET 1.
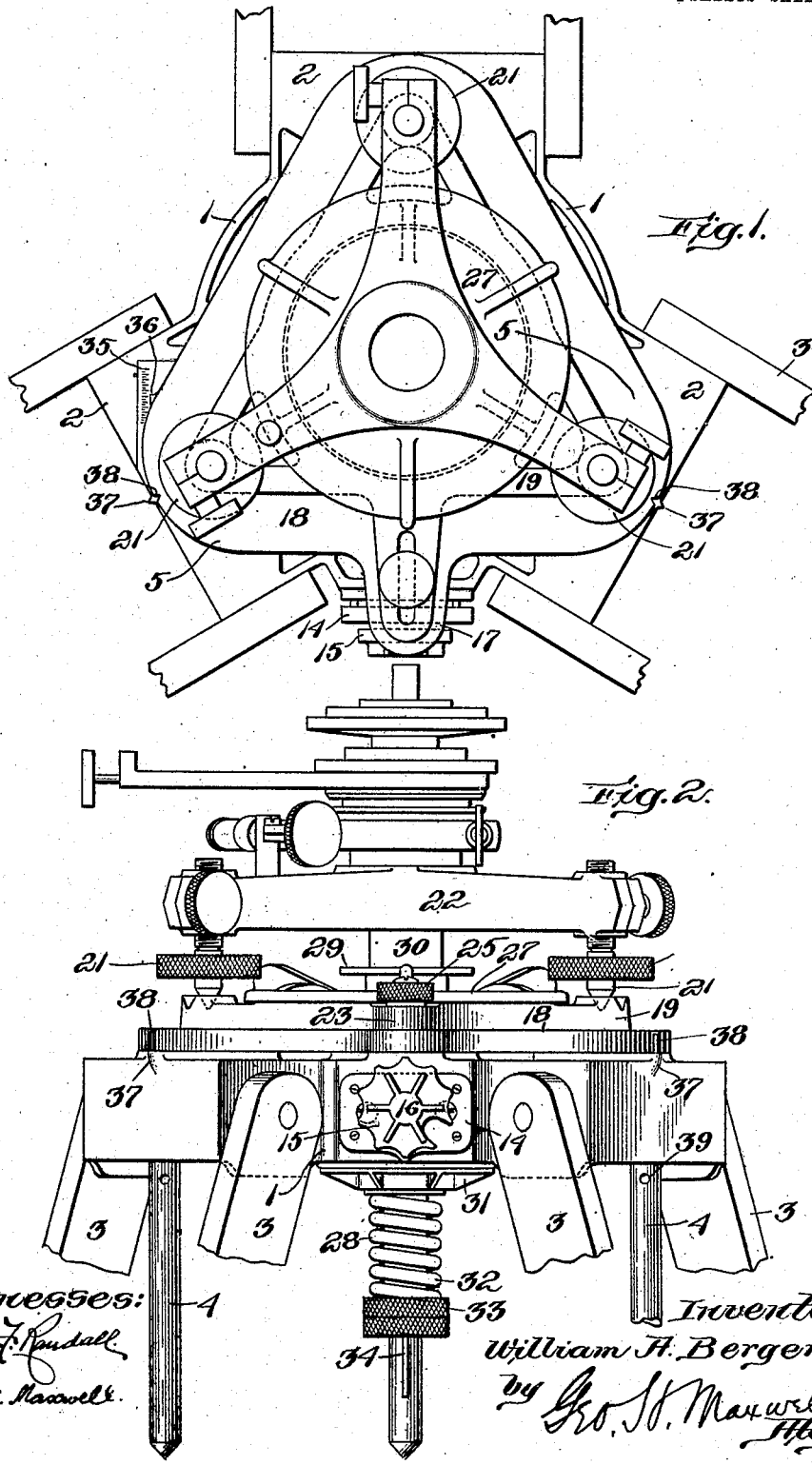

W. A. BERGER.
LATERAL ADJUSTER FOR SURVEYING INSTRUMENTS.
APPLICATION FILED JUNE 10, 1907.
918,817.
Patented Apr. 20, 1909.
2 SHEETS—SHEET 2.
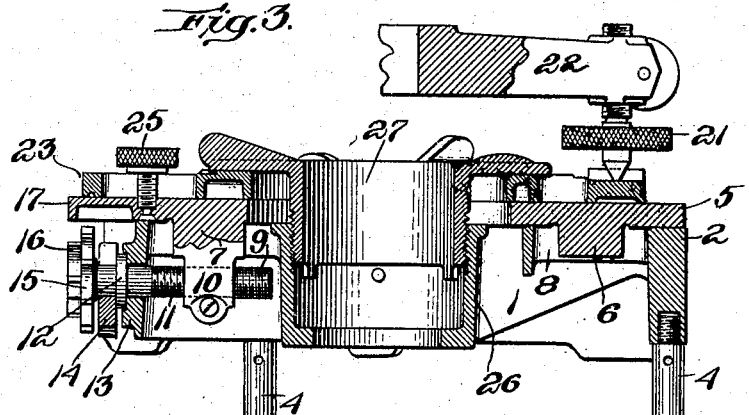
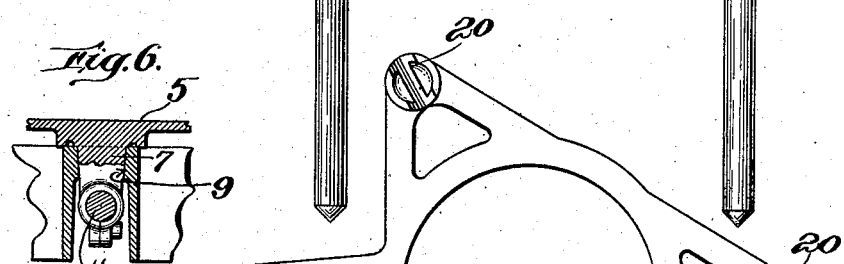
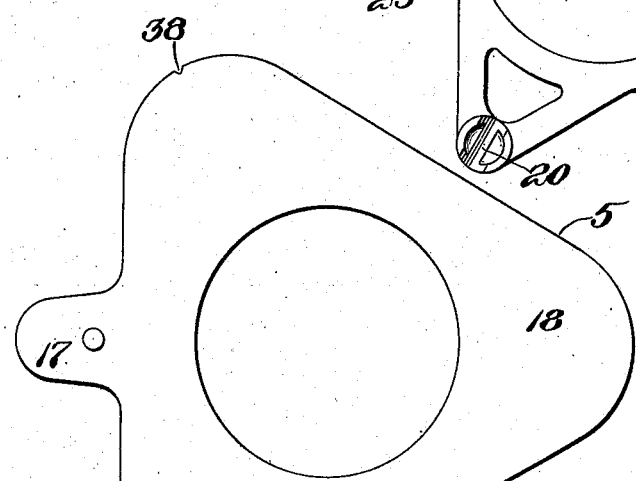
Witnesses:
Arthur T. Randall
Edward Maxwell
Inventor:
William A. Berger;
by Geo. H. Maxwell
Atty.

UNITED STATES PATENT OFFICE.

WILLIAM A. BERGER, OF BOSTON, MASSACHUSETTS.

LATERAL ADJUSTER FOR SURVEYING INSTRUMENTS.

No. 918,817.        Specification of Letters Patent.        Patented April 20, 1909.

Application filed June 10, 1907. Serial No. 378,198.

*To all whom it may concern:*

Be it known that I, WILLIAM A. BERGER, a citizen of the United States, and resident of Boston, in the county of Suffolk and State of Massachusetts, have invented an Improvement in Lateral Adjusters for Surveying Instruments, of which the following description, in connection with the accompanying drawing, is a specification, like numerals on the drawing representing like parts.

My invention is an improvement in the type of instrument covered by Letters Patent of the United States No. 696,401, dated April 1, 1902, and No. 839,541, dated December 25, 1906, whereby the entire instrument including the leveling screws or whatever means is employed for leveling the instrument is mounted on a shifting plate, which in turn is carried by a lateral adjuster, whereby said instrument and its leveling means may be shifted with the shifting plate without disturbing a previously made adjustment of the leveling means. Having rough-centered the instrument by means of the shifting plate thus mounted, it is brought into accurate position by the slow-motion longitudinal movement of the lateral adjuster.

My invention embodies further features whereby various constructional details are eliminated and simplified, the height of the surveying instrument is not materially increased, the rough-shifting plate or centering plate for the instrument proper rests on the lateral adjuster plates, the instrument is capable of direct use as a tripod device or as a trivet device, etc., all as will be made more fully apparent in the course of the following description, taken with reference to the accompanying drawings, in which I have shown a preferred embodiment of the invention.

The invention is applicable to any instrument having a sighting device, such as a telescope with cross wires used for measuring purposes, *i. e.*, with any surveying or measuring instrument for use in tunnels, mines, or on the surface or otherwise.

In the drawings: Figure 1 is a top plan view and Fig. 2 a side elevation of an instrument embodying my invention; Fig. 3 is a transverse sectional view thereof, parts being broken away for clearness of illustration; Figs. 4 and 5 are plan views respectively of the shifting plate and slide plate; and Fig. 6 is a cross sectional detail showing the guiding arrangement of the lateral adjuster plates.

As the general purpose and operation of a lateral adjuster are fully set forth in the patents before mentioned, I refer therefor to said patents, and confine myself herein to the improvements which constitute my invention.

The supporting head 1 of the instrument, which, in my present invention, constitutes the guide plate as well as the head of the tripod and trivet of the instrument, has preferably three ends 2 for receiving the usual bifurcated ends 3 of the tripod, between which I secure short depending, stud-like, legs 4 in such position that they do not interfere in any way with the normal tripod use of the instrument, and yet are ready at all times for stoping, tunnels, subway work, or other low-work. The top of the head or guide plate 1 is flat to receive the complemental slide plate 5 in guided relation thereto, one of said plates being provided with guide ways, and the other with coöperating guiding means such as a boss, the slide plate being herein shown as provided with bosses 6, 7, and the guide plate or head is provided with slots or ways 8, 9 for receiving and accurately directing said bosses, the cooperating engaging surface of said parts being slightly wedge-shaped, as shown more clearly in Fig. 6. The boss or lug 7 has an internally threaded projecting clamping end 10 engaged by an adjusting screw 11, whose shoulder 12 is held between the adjacent wall 13 of the guide plate and a cross plate fixed thereon. The screw 11 has a peculiar thumb nut or head at its outer end by which it is turned, best shown in Figs. 2 and 3, where it will be seen that it consists of an indicator wheel 15 whose points or angular projections correspond to aliquot parts of a unit of measurement of the distance traversed by the top plate or slide plate on the bottom or guide plate as the screw is turned; and in front of the thumb nut or wheel 15, and formed as a part thereof, is a star wheel or radially ribbed projection 16 for aiding the operator in determining by feeling (*e. g.* in tunnel work) the exact distance to which he has shifted the top part of the telescope by rotating the screw 11. The ribbed outer end 16 is also provided to receive a wrench in case it should be desired to move the instrument more readily than convenient for thumb adjustment. The slide plate has a projecting shelf 17 overhanging the screw 11 and its turning means 15, 16, so as to protect them at all times from accidental injury by dropping gravel, stone, or the like, (as often happens in mine work). The top surface 18 of the slide plate 5 is plane, see Figs. 2, 3, and 5. Resting flat upon this surface 18 is a shifting carrying plate or ring 19, preferably triangular in general shape and provided with foot rests 20, in whose V-shaped grooves rest the usual leveling screws 21 of the instrument which is mounted on my attachment. This instrument may be a theodolite, mining transit, or any other instrument of such a nature as to require accurate lateral adjustment, and hence I have omitted to show and describe the details thereof, simply showing the head or base support 22 of the head. The carrying plate or shifting plate or ring 19 is provided with clamping means for securing it in shifted position on the lateral adjuster portion of the apparatus, said means herein consisting of an arm or flat projection 23, slotted at 24 to receive a set screw 25, having threaded engagement with the slide plate 5, as clearly shown in Figs. 1–3. The interior of the head or guide plate 1 is hollow or cylindrical in usual manner, as indicated at 26, for receiving the threaded end of a usual clamping ring 27, and the instrument proper is secured in place by a usual hollow shifting post 28, whose upper end 29 engages the depending stud or stem 30 of the instrument proper, being clamped by a nut 31, spring 32, and adjusting nut 33 in usual manner.

At 34 I have indicated the usual chain or hook for receiving the plumb bob cord (not shown).

At 35 the head or guide plate 1 is provided with a scale extending parallel to the direction of sliding movement of the slide plate, which has a finger or angular projection 36 for indicating the relative position of the two plates 1 and 5. The normal or central position of said plates is further indicated by alining notches and projections, a pointer 37 on the plate 1 and notch 38 on the plate 5 being shown herein at the corners of said plates at either side of the adjusting screw.

In use, the lateral adjuster is first brought to its center with relation to the tripod or trivet support, indicated by the alining of the pointers and notches 37, 38. The triangular shifting or carrying plate 19 is also brought to its center, indicated readily to the operator by feeling an equal space all about it on the sliding plate. The entire instrument is then set up in such a position that the motion of the lateral adjuster is at right angles to the line of sight, which will ordinarily bring the adjusting screw or other device 11, 15 adjacent the right hand of the operator. The instrument is then leveled up in usual manner by the leveling screws 21, and roughly centered or oriented by sliding the shifting plate 19 in whatever direction is required in order to bring the sighting instrument or telescope approximately on the target or other distant object. The shifting carrying plate 19 is then clamped immovably on the slide plate 5 by means of the thumb screw 25. Thereupon the operator rotates the adjusting screw 11 forward or backward as the case may require until the cross wires of the telescope accurately bisect the object being sighted.

As the lateral adjuster plates 1 and 5 are low down, and preferably themselves constitute practically the tripod head, all danger of even the minutest inaccuracy which might be due to the raised and more or less complicated adjustments and positions of the parts in the before mentioned lateral adjusters is eliminated. Not only is the lateral adjuster brought down to the tripod or trivet itself, but the broad plane triangular shape of the two plates, resting flat down upon each other throughout substantially their entire area, affords at all times a broad base and precise alinement or maintenance of level. Moreover, by having the shifting plate flat upon the top of the lateral adjuster plates, I not only bring the instrument down much more compactly than in the previous devices referred to, but the rough centering of the instrument is accomplished more readily, as the shifting plate supports merely the instrument head proper. By having the pins or legs 4 located in the guide plate as shown, they do not interfere in any way with the usual tripod use of the apparatus, and yet render the instrument always serviceable for trivet use wherever the exigencies of the position require it. I preferably provide any suitable means, as holes 39, to be engaged by a spanner or pin for tightening or removing said legs 4 if required.

As already stated, I do not intend to restrict my invention to any particular kind of mining transit or other instrument, and I wish it also understood that my invention is capable of a wide range of physical embodiments without departing from the spirit and scope of the invention as defined in the claims.

Having described my invention, what I claim as new and desire to secure by Letters Patent is:

1. A lateral adjuster for measuring instruments, comprising a movable slide plate, a guide plate restricting said slide plate to rectilinear movement in one direction only, a superposed shifting plate mounted on said slide plate to slide freely thereon in all directions for rough-centering the instrument, and means for securing the instrument, including its leveling means, in place above said shifting plate whereby the instrument may be moved with said shifting plate and also with said slide plate without disturbing a previously made adjustment of the leveling means.

2. A lateral adjuster for measuring instruments, comprising a slide plate and a guide plate relatively movable in a longitudinal direction only, a superposed shifting plate mounted thereon to slide freely in all directions for rough-centering the instrument, and means for securing the instrument including its leveling screws in place above said shifting plate.

3. A lateral adjuster for measuring instruments, comprising two lateral adjuster plates having widely extended plane contacting surfaces on their adjacent sides, one plate being provided with narrow alining grooves and the opposite plate with narrow projecting bosses fitting said grooves, slow-motion adjusting means in line with said bosses for moving one of said plates with relation to the other, and means for supporting and securing an instrument head above said plates.

4. A lateral adjuster for measuring instruments, comprising two lateral adjuster plates having widely extended plane surfaces on their adjacent sides, one plate being provided with narrow alining grooves and the opposite plate with narrow projecting bosses fitting said grooves, slow-motion adjusting means for moving one of said plates with relation to the other, said means containing a screw having an externally projecting head provided with two sets of radial points, the outer set being in the form of ribs, and means for supporting and securing an instrument head above said plates.

5. A lateral adjuster for measuring instruments, comprising two lateral adjuster plates having widely extended plane surfaces on their adjacent sides, one plate being provided with narrow alining grooves and the opposite plate with narrow projecting bosses fitting said grooves, slow-motion adjusting means for moving one of said plates with relation to the other, said means containing a screw having an externally projecting head provided with two sets of radial points, the outer set being in the form of ribs, the top plate carrying a protector overhanging said projecting head, and means for supporting and securing an instrument head above said plates.

6. A lateral adjuster for measuring instruments, comprising a slide plate and a guide plate relatively movable longitudinally, the top one of said plates having a plane surface, a shifting carrying plate movable laterally in all directions lying flat on said plane surface and provided with means for supporting above it an instrument head, and means for clamping said shifting plate to said top plate independently of the under plate.

7. A lateral adjuster for measuring instruments, comprising a slide plate and a guide plate relatively movable longitudinally, the top one of said plates having a plane top surface, a shifting carrying plate slidingly mounted flat on said plane surface for movement bodily in all directions and provided with means for supporting above it an instrument head, means for clamping said shifting plate to said top plate independently of the under plate, and means for clamping all three plates immovably together.

8. A lateral adjuster for measuring instruments, comprising a slide plate and a guide plate relatively movable longitudinally, the top one of said plates having a plane top surface, a shifting plate lying flat upon said plane surface and provided with a slotted arm, and a clamping screw having threaded engagement through said slot with said top plate for clamping the shifting plate immovably thereon.

9. A lateral adjuster for measuring instruments, comprising an instrument head, supporting means therefor, a head plate provided with means for receiving a tripod, stud-like supports depending from adjacent the outer ends of said head plate in position away out of interference with the tripod, an intermediate plate resting in direct contact with said head plate, said head plate and intermediate plate being provided with coöperating alining means for directing the intermediate plate longitudinally in its movement on the head plate, and slow-motion adjusting means therefor.

10. A lateral adjuster for measuring instruments, comprising a branching head plate having a flat top surface, a coöperating plate mounted to slide on said top surface, said two plates having complemental alining and guiding means for accurately limiting said sliding movement to longitudinal direction, slow-motion adjusting means for said movement, said two plates having on either side of said adjusting means indicating means located adjacent the ends of the branches of the head plate for indicating to the touch when the plates are in normal alined position, and means for securing an instrument head in place above the top plate.

11. A lateral adjuster for measuring instruments, comprising a head plate, a coöperating plate mounted to slide on the top surface of said head plate, said two plates having complemental alining and guiding means for accurately limiting said sliding movement to longitudinal direction, slow motion adjusting means for said movement, the top one of said two plates having in its top surface means for receiving and positioning the leveling screws of an instrument head, and means for securing an instrument head in place above said top plate.

12. A lateral adjuster for measuring instruments, comprising a branching head plate, removable stud-like legs secured to its under side at the outer ends of its branches as a trivet support, a lateral adjuster plate mounted on the top of said head plate, said two plates having coöperating means for maintaining accurate longitudinal movement of one with relation to the other, slow-motion means for producing said movement, and means including a universally movable shifting carrying plate mounted on said lateral adjuster plate for securing an instrument head and its vertical adjusting screws above the top plate.

In testimony whereof, I have signed my name to this specification, in the presence of two subscribing witnesses.

WILLIAM A. BERGER.

Witnesses:
 GEO. H. MAXWELL,
 EDWARD MAXWELL.